United States Patent
Ishihara et al.

[11] Patent Number: 5,954,176
[45] Date of Patent: Sep. 21, 1999

[54] CLUTCH DISCONNECTION/CONNECTION DEVICE

[75] Inventors: Masaki Ishihara; Yasushi Yamamoto; Chuji Yamada; Nobuyuki Iwao, all of Fujisawa, Japan

[73] Assignee: Isuzu Motors Limited, Tokyo, Japan

[21] Appl. No.: 08/967,401

[22] Filed: Nov. 11, 1997

[30] Foreign Application Priority Data

Nov. 13, 1996  [JP]  Japan ................................. 8-301698

[51] Int. Cl.⁶ ................................................. F16D 19/00
[52] U.S. Cl. .............................................. 192/83; 192/85
[58] Field of Search ................................. 192/83, 85 C, 192/3.57, 3.58, 91 R

[56] References Cited

U.S. PATENT DOCUMENTS

| | | | |
|---|---|---|---|
| 3,752,282 | 8/1973 | Espenshied | 192/83 X |
| 4,745,999 | 5/1988 | Brugger et al. | 192/85 C X |
| 4,796,739 | 1/1989 | Jonner et al. | 192/85 C X |
| 5,002,166 | 3/1991 | Leigh-Monstevens et al. | 192/83 X |
| 5,031,735 | 7/1991 | Holmes | 192/83 X |
| 5,135,091 | 8/1992 | Albers et al. | 192/85 C |
| 5,273,143 | 12/1993 | Voss et al. | 192/83 X |

FOREIGN PATENT DOCUMENTS

| | | |
|---|---|---|
| 0 231 465 | 8/1987 | European Pat. Off. . |
| 0 516 309 | 12/1992 | European Pat. Off. . |
| 41 21 016 | 1/1992 | Germany . |
| 41 25 162 | 2/1993 | Germany . |
| 4-8023 | 3/1992 | Japan ................... B60K 41/22 |
| 9-53658 | 2/1997 | Japan ................... F16D 25/08 |

OTHER PUBLICATIONS

Patent Abstract of vol. 016, No. 002 (M–1197)–Jan. 7, 1992 JP 03 229021 A (Hino Motors Ltd)–Oct. 11, 1991.

*Primary Examiner*—Charles A Marmor
*Assistant Examiner*—Roger Pang
*Attorney, Agent, or Firm*—McCormick, Paulding & Huber LLP

[57] ABSTRACT

The clutch disconnection/connection device of the present invention includes manual disconnection/connection devices for manually disconnecting/connecting a clutch by operation of a clutch pedal, and automatic disconnection/connection devices for automatically disconnecting/connecting the clutch by controllably supplying air pressure to or discharging the air pressure from a clutch booster. The clutch disconnection/connection device further includes a clutch pedal stroke sensor for detecting magnitude of clutch pedal stroke(CPS), a clutch stroke sensor for detecting magnitude of clutch stroke(CS), and a controller for, based on output signals from the clutch pedal stroke sensor and the clutch stroke sensor, when the clutch pedal is stepped during automatic disconnection/connection operation in such a degree as corresponding to the actual clutch stroke(CS) state or thrusting the clutch to more disconnected state, discontinuing the automatic disconnection/connection operation and initiating the manual disconnection/connection operation.

11 Claims, 4 Drawing Sheets

CLUTCH DISCONNECTION/CONNECTION DEVICE

BACKGROUND OF THE INVENTION

1. Technical Field

The present invention is related to a clutch disconnection/connection device, and more particularly to a clutch disconnection/connection device that is capable of automatic clutch operation of a vehicle.

2. Background Art

Recently, the demand for automatic transmission is increasing not only in small vehicles but also in large vehicles such as buses and trucks. Since a fluid-type torque converter adopted as a clutch type in smaller cars is disadvantageous when it is used for large vehicles of heavy weight and large load because it increases their fuel consumption, in case of large vehicles, automatic transmission is normally achieved by disconnecting/connecting friction clutches through automatic operation and then transferring the output to a transmission that is automatically operated. A clutch disconnecting/connecting device of this kind carrying out automatic clutch operation is generally provided with a clutch booster that disconnects/connects the friction clutches by supplying/discharging air pressure.

However, as a quite delicate operation is required at starting the vehicle or some other occasions, if the clutch disconnection/connection device tries to maintain its automatic clutch control even in such tricky situations, it inevitably has to have a complicated and thus costly design. Thus, another type of clutching disconnection/connection device has been proposed that is basically automatic but allows manual operation by a clutch pedal only when a delicate clutch operation is required (what is called a semi-automatic clutch system). The semi-automatic clutch system has an advantage that its construction is simpler and less costly. In the semiautomatic clutch system, a hydraulic pressure is supplied from/discharged to a master cylinder by operating the clutch pedal, and air pressure is supplied to/discharged from the clutch booster by this supplying/discharging of hydraulic pressure.

By the way, air pressure is supplied to/discharged from the clutch booster during automatic transmission(except for starting the vehicle) regardless of operation of the clutch pedal. In addition, the clutch booster is constructed as to operatively disconnect/connect the clutch by pushing an internal power piston when the air pressure is supplied.

In the conventional device mentioned above, a passage for distributing the hydraulic pressure from the master cylinder communicates with an hydraulic cylinder(of the booster) that changes its volume in accordance with the movement of the power piston. Therefore, during the automatic disconnection/connection control of the clutch, that is, when the disconnection/connection control of the clutch is performed by the power piston without operating the clutch pedal, movement of the hydraulic piston due to the pushing of the power piston could cause a negative pressure inside the hydraulic pressure distribution passage and introduction of air bubbles into the passage, making an accurate operation of the clutch impossible.

In order to prevent the occurrence of such negative pressure as above, Japanese Utility Model No. 4-8023 and others suggest providing a cancellation mechanism of manual operation and automatic operation in an hydraulic output part of the clutch booster, such that change in volume of the hydraulic pressure distribution passage can be prevented during the automatic operation. However, this kind of structural modification of the clutch booster ends up with complicated arrangements(necessary for reliable sealing) in a relatively small space, resulting in not only higher cost but also less reliability and perseverance of the device as a whole.

Thus, for solving the problems as above, the applicant of the present invention has previously proposed a clutch disconnection/connection device in which the structure of the clutch booster is not modified but the master cylinder can be operated by another drive means(air pressure or hydraulic pressure), as well as by the clutch pedal.

One example of such a new type device is described in Japanese Patent Application 7-205859. That device supplies an air pressure to the master cylinder in an automatic disconnection operation of the clutch and pushes a piston with the air pressure in accordance with the clutch-disconnection operation such that an hydraulic pressure is generated from the master cylinder. Due to this, the occurrence of negative pressure inside the hydraulic pressure distribution passage can reliably prevented.

In such a conventional device as above, the manual operation is preferentially performed to the automatic operation. That is, even when the clutch is automatically operated, if the driver steps the clutch pedal, the automatic operation is discontinued and switched to the manual operation.

However, as this transition(shift) is carried out after a clutch pedal switch has detected the driver's stepping the clutch pedal and a relatively slight stroke(stepping) of the clutch pedal is sensitively detected by the clutch pedal switch, if the clutch pedal is stroked(stepped) when the clutch is completely disconnected, the clutch may rapidly move to a position corresponding to the state of the stroked clutch pedal, causing a relatively big clutch-connection shock, especially at a low-speed gear operation.

Some modifications, such as detecting the stroke of the clutch pedal at a larger stroke(a more disconnecting stroke) or slowing the speed at which the clutch returns when the automatic operation is discontinued has been proposed. But none of them provides the driver an ideal clutch operation as he/she desires.

SUMMARY OF THE INVENTION

The clutch disconnection/connection device of the present invention includes: manual disconnection/connection means for manually disconnecting/connecting a clutch by operation of a clutch pedal; automatic disconnection/connection means for automatically disconnecting/connecting the clutch by controllably supplying air pressure to or discharging the air pressure from a clutch booster; a clutch pedal stroke sensor for detecting magnitude of clutch pedal stroke (CPS); a clutch stroke sensor for detecting magnitude of clutch stroke(CS); and a controller for, based on output signals from the clutch pedal stroke sensor and the clutch stroke sensor, when the clutch pedal is stepped during automatic disconnection/connection operation in such a degree as corresponding to the actual clutch stroke(CS) state or thrusting the clutch to more disconnected state, discontinuing the automatic disconnection/connection operation and initiating the manual disconnection/connection operation.

According to the arrangement above, the automatic disconnection/connection operation is not switched to the manual one unless the clutch pedal is stepped to such a degree as corresponding to the actual Clutch Stroke state or thrusting the clutch to more disconnected state. Due to this, the troublesome sudden approach of the clutch(and resulting shock) when the clutch pedal is carelessly stepped can reliably be avoided.

BRIEF DESCRIPTION OF THE ACCOMPANIED DRAWINGS

DETAILED DESCRIPTION OF THE PREFERRED EMBODIMENTS

Now, a preferred embodiment of the present invention will be described with reference to the accompanying drawings.

Figure 1:
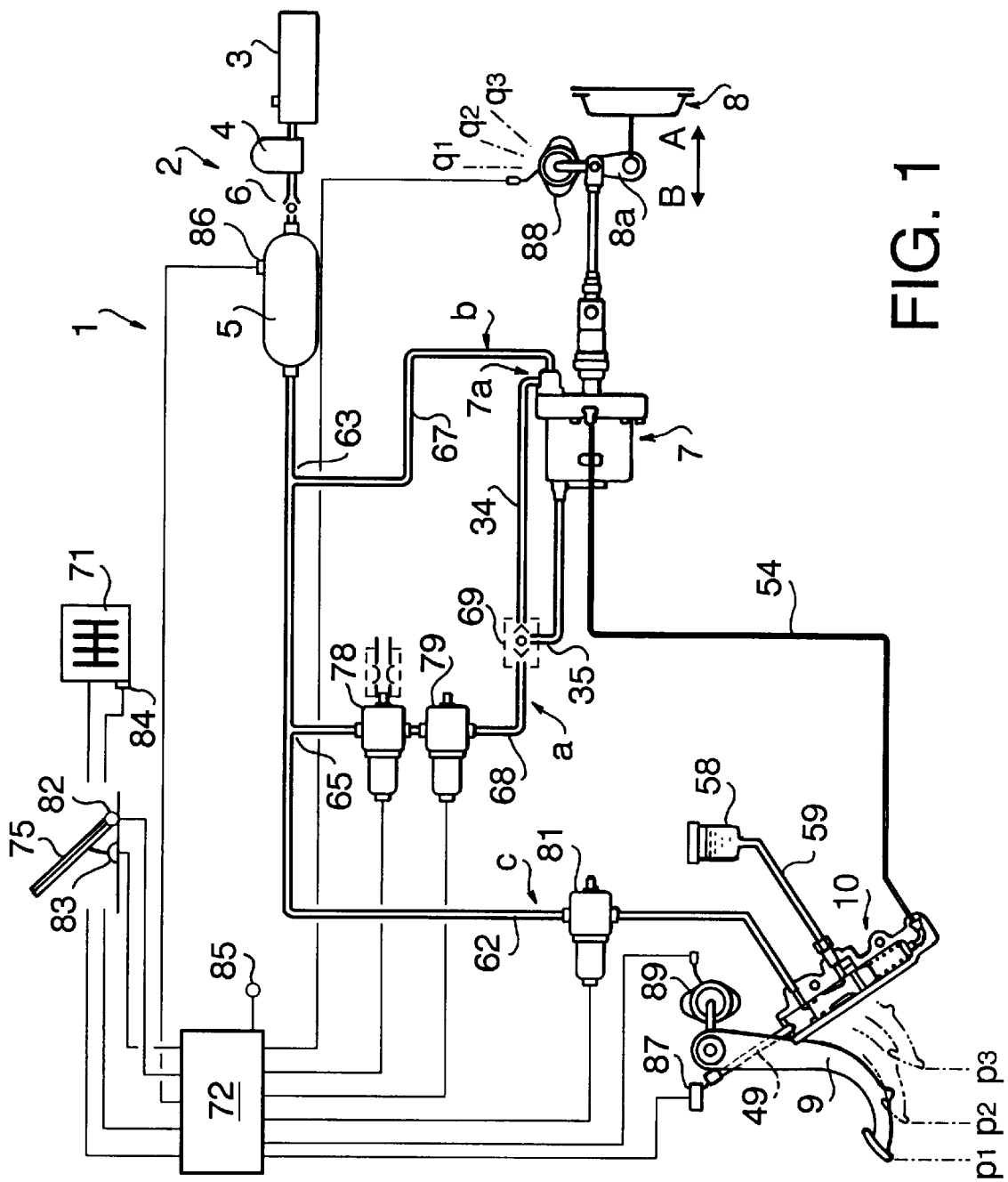
FIG. 1 is a drawing showing the whole structure of a clutch disconnection/connection device of the present invention.

FIG. 1 is a drawing showing the whole structure of a clutch disconnection/connection device of the present invention. The clutch disconnection/connection device 1 includes an air pressure supply means 2 for supplying air pressure. The air pressure supply means 2 includes a compressor 3 that is driven by an engine(not shown) for generating air pressure, an air drier 4 for drying the air from the compressor 3, an air tank 5 for reservoiring the air from the air drier 4, and a check valve 6 provided on the entrance side of the airtank 5. The air pressure from the air pressure supply means 2 is distributed to a clutch booster 7 and the clutch booster 7 operatively moves a friction clutch 8 to the disconnection side(to the right-hand side in FIG. 1) due to the supplied air pressure. An hydraulic pressure is also supplied to the clutch booster 7 from a master cylinder 10, as described below in details.

Figure 2:
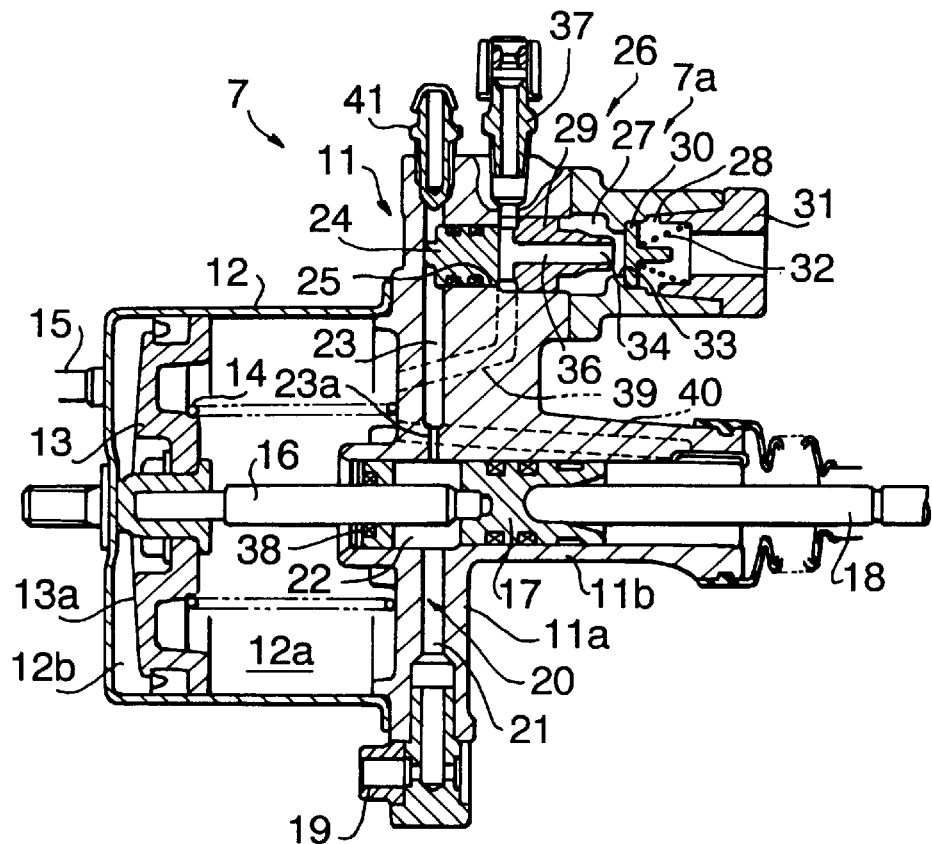
FIG. 2 is a vertically sectional view of a clutch booster of the clutch disconnection/connection device of FIG. 1.

FIG. 2 is a detailed vertically sectional view of the clutch booster 7. This clutch booster 7 is constructed similar to the conventional model. As shown in FIG. 2, the clutch booster 7 includes a cylinder shell 12 connected to its body 11. Inside the cylinder shell 12, a piston plate(a power piston) 13 is provided such that it 13 is biased by a return spring 14 toward the air pressure introduction side(to the left in FIG. 2). An air pressure nipple 15 is mounted at one end of the cylinder shell 12. The air pressure nipple 15 forms an opening for introducing air pressure from the air tank 5 by way of an air pressure path 35(Refer to FIG. 1). When air pressure is introduced through the air pressure nipple 15, the piston plate 13 is pushed to the right in the drawing. The piston plate 13 then pushes a piston rod 16, a hydraulic piston 17 and a push rod 18, for pushing the clutch lever 8a (Refer to FIG. 1) to the disconnection side A and disconnecting the friction clutch 8.

On the other hand, a hydraulic pressure distribution passage 20 is formed inside the body 11. The opening of the hydraulic pressure distribution passage 20 for introducing hydraulic pressure is defined by the hydraulic pressure nipple 19. An end of a hydraulic pressure distributing path 54 is connected to the hydraulic pressure nipple 19. The hydraulic pressure distribution passage 20 is defined by a bore 21 formed at one(lower) end of the body flange 11a, a hydraulic cylinder 22(provided in the body cylinder 11b) for accommodating the hydraulic piston 17, a control bore 23 at the other(upper) end that is communicating with the hydraulic cylinder 22 by way of a small bore 23a. When a hydraulic pressure is introduced from the hydraulic pressure nipple 19, the hydraulic pressure reaches the control bore 23 through the hydraulic pressure distribution passage 20 and pushes the control piston 24 along the control cylinder 25 to the right (in the drawing). In short, a control valve part 7a(a hydraulically operated valve) for controlling the air pressure supply to the clutch booster 7 is formed on the upper-end side of the body flange 11a, as described below in details.

A control body 26 projects from the right side(in the drawings) of the control valve part 7a. In the control body 26, a control chamber 27 coaxially communicating with the above described control cylinder 25 and an air pressure port 28 are formed. A control part 29 of the control piston 24 is slidably accommodated in the control chamber 27 and a poppet valve 30 is slidably accommodated in the air pressure port 28. A nipple 31 connected with an air pressure path 67(Refer to FIG. 1) is provided at the air pressure port 28 such that air pressure can be constantly supplied to the air pressure port 28.

The poppet valve 30 is normally biased in the left-hand side(in FIG. 2) direction by the air pressure and a poppet spring 32 such that it 30 closes a communication port 33. The control chamber 27 communicates with the air pressure port 28 through the communication port 33. Accordingly, the air pressure from the nipple 31 is blocked by the poppet valve 30 when it 30 is in the normal position. Then, when a hydraulic pressure is supplied from the hydraulic pressure distributing path 54, the control part 29 of the control piston 24 pushes the poppet valve 30 in the right-hand side direction(in FIG. 2) and the communication port 33 is opened. The air pressure enters the control chamber 27 from the communication port 33, and as described below in details, flows into the cylinder shell 12 through an air pressure path 34 and the air pressure path 35(Refer to FIG. 1), works on an air pressure working surface 13a being the left side of the piston plate 13, pushing this air pressure working surface 13a and thus operatively disconnecting the clutch 8.

It should be noted that the clutch booster 7 is able to change the degree of the stroke operation of the clutch 8 according to the magnitude of the supplied hydraulic pressure. More specifically, when the hydraulic pressure being supplied to the clutch booster 7 is increased by only a relatively small magnitude, the piston plate 13 is pushed to the right-hand side(in FIG. 2) due to the above described air pressure and thus the hydraulic piston 17 is associatedly pushed to the right-hand side by a predetermined degree of stroke. The resulting increased volume of the hydraulic pressure distribution passage 20 and decreased hydraulic pressure in the control bore 23 brings about "a balanced state" in which the control part 29 of the control piston 24 is pushing the poppet valve 30 but the poppet valve 30 still closes the communication port 33. In this "balanced state", a predetermined magnitude of air pressure is maintained throughout the control chamber 27, the air pressure paths 34 and 35, and an air pressure introduction chamber 12b provided adjacent to the air pressure working surface 13a of the piston plate 13, thus holding the piston plate 13 at the predetermined stroke position and keeping the friction clutch 8 at the predetermined "half-clutch" position between disconnection and connection.

When the hydraulic pressure is completely discharged, the magnitude of the hydraulic pressure in the control bore 23 further decreases and thus the control piston 24 is returned back to its original(leftmost) position as shown in FIG. 2. The control part 29 then runs off the poppet valve 30 and a release port 36 provided inside the control part 29 communicates with the control chamber 27. The retained air pressure is introduced into an air chamber 12a on the opposite side of the air pressure introduction chamber 12b by way of the release port 36 and an atmospheric pressure port 39. Due to this, the air pressure that has been pushing the piston plate 13 to the right-hand side now pushes the return plate 13 to the opposite(left-hand) side cooperatively working with the return spring 14, moving the friction clutch 8 to the connecting(left-hand) side B. The remaining air pressure is released outside through a breather 37.

As a check valve that is only capable of discharge is installed in the breather 37, a connection failure of the friction clutch 8 during the clutch connection operation may occur due to a negative pressure inside the air chamber 12a. In order to prevent this, it is necessary to introduce a portion of the air pressure into the air chamber 12a and discharge the rest from the breather 37.

Further, the clutch booster 7 includes a seal member 38 for air-tightly partitioning the air(cylinder) chamber 12a from the hydraulic cylinder 22, another atmospheric pressure port 40, and an another breather 41 that is capable of discharging air in the hydraulic oil when the oil is heated.

In short, the control valve part 7a, based on the signal hydraulic pressure from the master cylinder 10 that moves in association with the operation of the clutch pedal 9, controls air pressure supply to/air pressure discharge from the clutch booster 7 for carrying out the manual disconnection/connection of the friction clutch 8.

Figure 3:
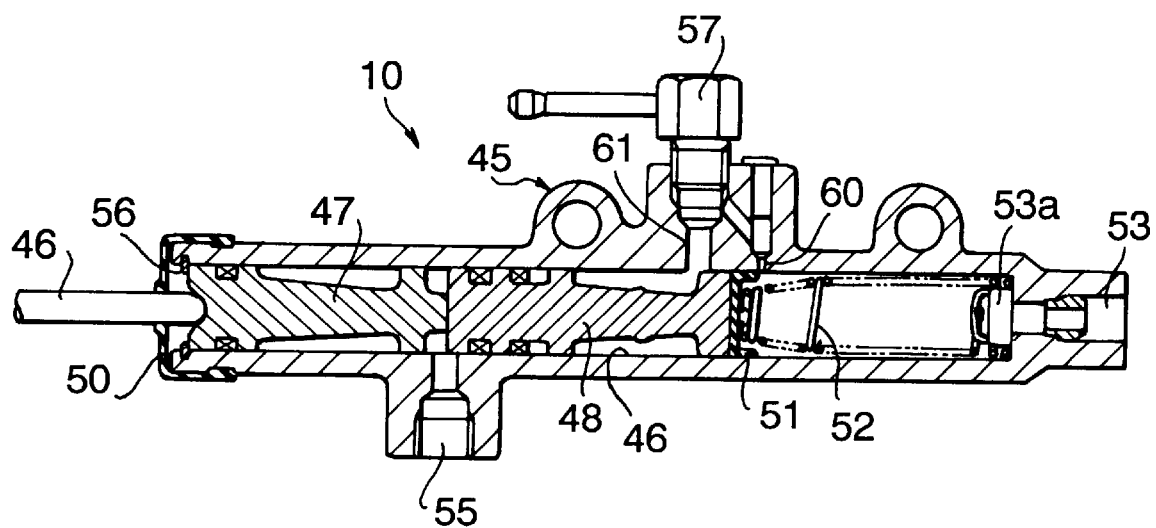
FIG. 3 is a vertically sectional view of a master cylinder of the clutch disconnection/connection device of FIG. 1.

FIG. 3 is a vertically sectional view showing the details of the master cylinder 10. As shown, the master cylinder 10 includes a cylinder body 45 extending in the longitudinal direction. A cylinder bore 46 of a predetermined diameter is formed inside the cylinder body 45. Two independent(first and second) pistons 47, 48 are slidably inserted into the cylinder bore 46, respectively. The tip of a push rod 49 that can slidably move in accordance with the stepping or return operation of the clutch pedal 9 is inserted into one(left-hand side) opening of the cylinder bore 46. This left-had side opening is further closed with a dust boot 50. Conversely, a return spring 52 that biases the first piston 47 and the second piston 48 to the left-hand side opening by way of a piston cup 51 is provided at the other(right-had side) side of the cylinder bore 46. The right-hand side end of the cylinder bore 46 communicates with a hydraulic pressure supply port 53 formed in the cylinder body 45. The hydraulic pressure distributing path 54 shown in FIG. 1 is connected to the hydraulic pressure supply port 53. A check valve 53a is provided in the hydraulic pressure supply port 53.

In the state shown in FIG. 3, the clutch pedal 9 has not yet been stepped and the first and second pistons 47, 48 are located at their original position on the left-hand side of the cylinder bore 46. An air pressure introduction port 55 is provided in the cylinder body 45 such that it 55 is situated between the first piston 47 and the second piston 48 in the initial state described above. In the master cylinder 10, the both of the pistons 47, 48 are pushed and supply hydraulic pressure when the manual operation(manual disconnection/connection) is performed by the clutch pedal 9. On the other hand, when the automatic operation(automatic disconnection/connection) is performed, as described below in details, air pressure is supplied through the air pressure introduction port 55 and only the second piston 48 is adjustably pushed. It should be noted that then the motion of the first piston 47 is suppressed by a snap ring 56. Since the first piston 47 does not move, the clutch pedal 9 does not make any travel, either. The master cylinder 10 also includes an oil-supply nipple 57 connected with an oil-supply path 59 extending from a reservoir tank 58 of the hydraulic oil(Refer to FIG. 1), a small-diameter port 60 for supplying oil at the right-hand side position of the piston cup 51, and a large-diameter port 61 for supplying oil at a position along the second piston 48.

Again referring to FIG. 1, the air pressure introduction port 55 of the master cylinder 10 is linked with the air tank 5 by an air pressure path 62. The air pressure path 62 has two branch points 63, 65. One end of the air pressure path 67 is connected to the branch point 63, while the other end of the air pressure path 67 is connected to the nipple 31 of the clutch booster 7. One end of another air pressure path 68 is connected to the branch point 65, while the other end of the air pressure path 68 is connected to the air pressure paths 34, 35 by way of a shuttle valve(a double-check valve) 69. The shuttle valve 69 carries out switching of flow according to pressure difference such that either the air pressure path 34 or the air pressure path 68 is connected to the air pressure path 35.

Herein, the air pressure paths 62, 68, 35 form the first air pressure supply path a that sequentially links the air tank 5, the branch point 65, the shuttle valve 69 and the air pressure nipple 15 of the clutch booster 7. On the other hand, the air pressure paths 62, 67, 34, 35 form the second air pressure supply path b that links the air tank 5 with the air pressure nipple 15 of the clutch booster 7 by way of the branch point 63. Either the first air pressure path a or the second air pressure path b is selected and used by switching the shuttle valve 69.

Two electromagnetic switch valves 78, 79 that are controllably switched by an electronic control unit(a controller) 72 such as ECU are provided on the air pressure path 68 of the first air pressure supply path a. These switch valves 78, 79 allow air pressure supply to the downstream(to the clutch booster 7) when they are open in their "ON" state. Conversely, when they 78, 79 are in their "OFF" state, they block the air pressure supply and releases the air pressure trapped in the downstream to the atmosphere. The switch valve 78 on the upstream(the air tank 5) side, especially, releases the air pressure trapped in the downstream through a throttle.

More specifically, as for the combinations of ON/OFF state of the switch valves 78 and 79, the ON/ON combination causes air pressure supply to the clutch booster 7, the ON/OFF causes air pressure discharge in a relatively short time, and the OFF/ON causes air pressure discharge in a relatively long time. The OFF/OFF combination produces substantially the same results as the ON/OFF combination. Accordingly, two stages of clutch connection speed is available and thus clutch connection shocks can be significantly reduced by selecting a most desirable combination. It should be noted that disconnection of the friction clutch 8 is carried out at a relatively high constant speed in general.

In addition, the air pressure path 62 linking the air tank 5 and the master cylinder 10 forms the third air pressure supply path c. The air pressure path 62 has an electromagnetic switch 81. The switch valve 81 is constructed similar to the above described switch valves 78, 79 and its switching is controlled by the control unit 72. More specifically, the switch valve 81 supplies air pressure to the master cylinder 10 when it is in "ON" state, while it 81 releases the air pressure from the master cylinder 10 to the atmosphere when it is in "OFF" state. The air pressure supply/discharge rate of the switch valve 81 can be adjustably controlled by performing the duty-control on the degree of openness of the valve 81.

The transmission 71 is so constructed as to perform automatic transmission. More specifically, when a transmission position is selected by a manual shift lever, transmission signals are generated by an electronic switch and these transmission signals are sent to the control unit 72. An actuator(not shown) is then operated according to these signals so that a transmission operation is substantially carried out by extraction, selection and insertion of gears. In short, what the driver is required to do is just selecting the switch(transmission) position.

In addition, the control unit 72 includes an accel pedal stroke sensor 82 and an idle switch 83 provided to the accel pedal 75, an emergency switch 84 provided near to the shift lever of the transmission 71, a vehicle speed sensor 85 provided near to the output shaft of the transmission 71, an pressure switch 86 provided in the air tank 5, a clutch pedal switch 87 and a clutch pedal stroke sensor 89 provided to the clutch pedal 9, and a clutch stroke sensor 88 provided to the friction clutch 8.

The clutch pedal 9 is biased by a clutch pedal spring(not shown) such that it is normally situated at the return position shown as p1. The clutch pedal switch 87 is then in "OFF" state. When the clutch pedal 9 is stepped to the switch actuation position p2, the clutch pedal switch 87 is tuned to "ON" state. The clutch pedal switch 87 remains in "ON" state from the switch actuation position p2 to the further stepped(more clutch-disconnecting) position of the clutch pedal 9. The furthermost stepped position of the clutch pedal 9 is shown as p3. In FIG. 1, the completely connected position q1, the switch actuation position q2, and the completely disconnected position q3 of the clutch lever 8a are also shown and each position corresponds with p1,p2,p3 of the clutch pedal 9 during the manual operation, respectively.

Figure 4:
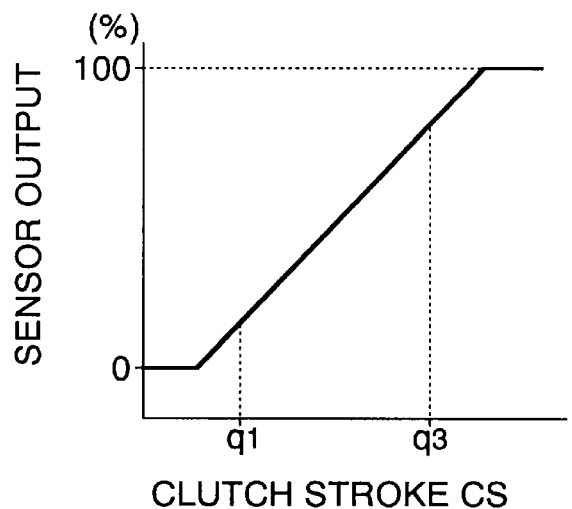
FIG. 4 is a graph showing a relationship between clutch stroke(CS) and output of a clutch stroke sensor.
Figure 5:
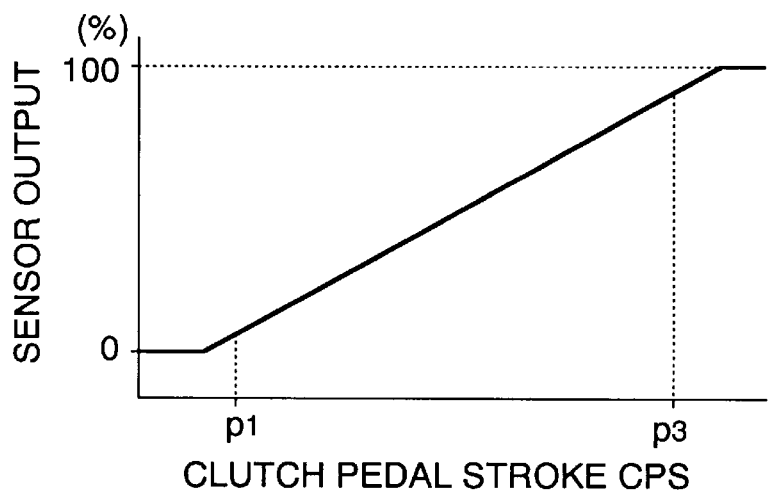
FIG. 5 is a graph showing a relationship between clutch pedal stroke(CPS) and output signal of a clutch pedal stroke sensor.

As shown in FIG. 5, the clutch pedal stroke sensor 89 constantly transmits output signals to the control unit 72, wherein the output signals are proportional to the degree of stroke from the return position p1 to the further stepped position of the clutch pedal 9(Clutch Pedal Stroke, CPS). Similarly, as shown in FIG. 4, the clutch stroke sensor 88 constantly transmits output signals to the control unit 72, wherein the output signals are proportional to the degree of stroke from the return position q1 to the further disconnected position of the clutch lever 8a(Clutch Stroke, CS).

Next, the operation of the clutch disconnection/connection device 1 will be described.

First, the automatic disconnection/connection operation of the clutch 8 will be described along with the brief summary of the operation of an automatic transmission. When transmission signals are input by the driver's shift operation, the control unit 72 makes both switch valves 78, 79 "ON"(open) state such that air pressure is supplied to the clutch booster 7 by way of the first air pressure supply path a. The clutch 8 is then disconnected. When the transmission operation of the transmission 71 is completed by the actuator (not shown), the switch valves 78, 79 are turned "OFF" by selecting a predetermined combination of their ON/OFF states such that the air pressure in the clutch booster 7 is discharged at a predetermined rate. As a result, the clutch 8 is operatively connected and the transmission is completed. As the pressure inside the air pressure path 34 is relatively low(this is not a manual operation), the shuttle valve 69 connects only the air pressure path 68 to the air pressure path 35 due to the higher pressure from the air pressure path 68.

Referring to FIG. 2, when the hydraulic piston 17 is moved to the right-hand side and the volume of the hydraulic cylinder 22 filled with the hydraulic oil is increased, a negative pressure may occur in the hydraulic pressure distribution passage 20 and the hydraulic pressure distributing path 54 and the like(they are called "the hydraulic pressure passage" hereinafter), allowing entrance of air bubbles into the hydraulic oil(this phenomenon is especially common during automatic disconnection/connection operation of the clutch 8). If air bubbles enter the hydraulic oil, hydraulic pressure can no longer be distributed accurately and the manual operation of the clutch 8 afterward becomes very difficult.

Thus, in order to solve this problem, the present invention proposes an arrangement in which air pressure is supplied to the first and the second pistons 47, 48 of the master cylinder 10 through the air pressure path 62 during the automatic disconnection/connection operation of the clutch 8 for pushing the second piston 48 such that the "the hydraulic pressure passage" is adequately pressurized. As a result, the occurrence of troublesome negative pressure in "the hydraulic pressure passage" can be reliably prevented.

Further, in the arrangement described above, a desirable initial pressure is provided during the automatic disconnection/connection operation of the clutch 8 by opening the switch valve 81 with slightly earlier timing before the switch valves 78, 79 are made open. Due to this, the occurrence of negative pressure can be substantially prevented.

Further, the combination of ON/OFF state of the switch valves 78, 79 can be made either ON/OFF or OFF/ON during the automatic connection operation of the clutch 8, closing these switch valves 78, 79 and discharging the air pressure from the clutch booster 7. "The hydraulic pressure passage" is then sequentially pressurized and the air pressure in the master cylinder 10 is released to the atmosphere by way of the switch valve 81. The first piston 48 now can return to its original position, thus returning the piston plate 13 and completing the automatic connection of the clutch 8. The switch valve 81 is closed slightly later than the closure of the switch valves 78, 79 such that the air pressure is retained as long as possible, substantially preventing the occurrence of negative pressures.

Next, when the clutch pedal 9 is manually operated, hydraulic pressure is distributed from the master cylinder 10 at the moment of stepping the clutch pedal 9. The control valve 7a is then opened and the shuttle valve 69 is switched due to the air pressure, connecting the air pressure path 34 and the air pressure path 35. The air pressure is now supplied to the clutch booster 7 and the clutch 8 is disconnected. Negative pressure is not caused in "the hydraulic pressure passage" during this manual operation because "the hydraulic pressure passage" is positively pressurized. On the other hand, when the clutch pedal 9 is returned to its original position, the air pressure is discharged from the clutch booster 7 and the clutch 8 is connected. It should be noted that all of the switch valves 78, 79, 81 are in "OFF" state during the manual operation.

Accordingly, a delicate manual operation of the friction 8 becomes possible when a vehicle is started. Also, even when the automatic operation of the clutch 8 becomes impossible due to troubles in electric systems and the like, clutch operation is swiftly switched to the manual one aid reliable transmission can always be achieved.

As described above, the automatic clutch disconnection/ connection device of the present invention that carries out automatic disconnection/connection of the clutch 8 by controllably supplying the air pressure to or discharging it from the clutch booster 7 includes the air pressure supply means 2, the first air pressure supply path a, the clutch booster 7, the electromagnetic switch valves 78, 79 and the control unit 72.

In addition, the manual clutch disconnection/connection device of the present invention that carries out the manual disconnection/connection of the clutch by clutch-pedal operation includes the air pressure supply means 2, the second air pressure supply path b, the clutch booster 7, the control valve part 7a, the master cylinder 10, the hydraulic pressure distributing paths 54 and the hydraulic pressure distributing passage 20.

The arrangement above is designed such that the automatic operation of the clutch 8 is swiftly switched to the manual one when the clutch pedal 9 is stepped to some extent. Now, this operation will be described below in details.

Figure 6:
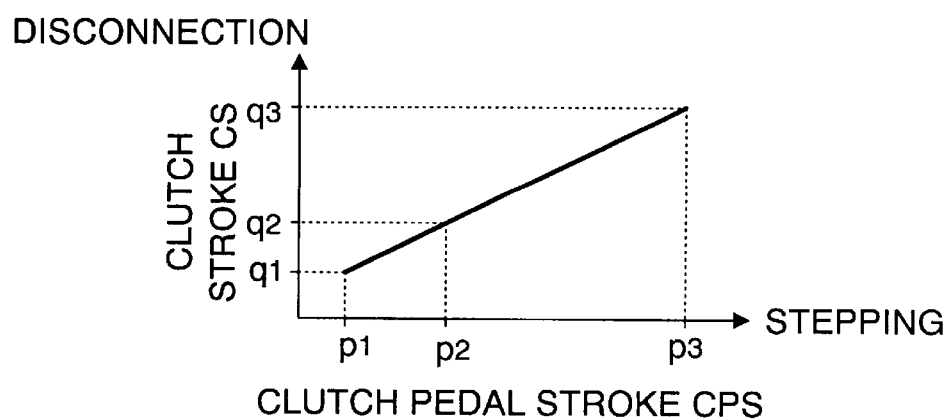
FIG. 6 is a graph showing a relationship between clutch pedal stroke(CPS) and clutch stroke(CS).

The table shown in FIG. 6 is pre-memorized as a map in the control unit 72. The table represents the relationship between Clutch Pedal Stroke(CPS) and Clutch Stroke(CS) during the manual operation of the clutch 8. More specifically, the table represents the relationship between output of the clutch pedal stroke sensor 89 and output of the clutch stroke sensor 88. This table shown in FIG. 6 is used in the transmission control by the control unit 72 described hereinbelow.

Figure 7:
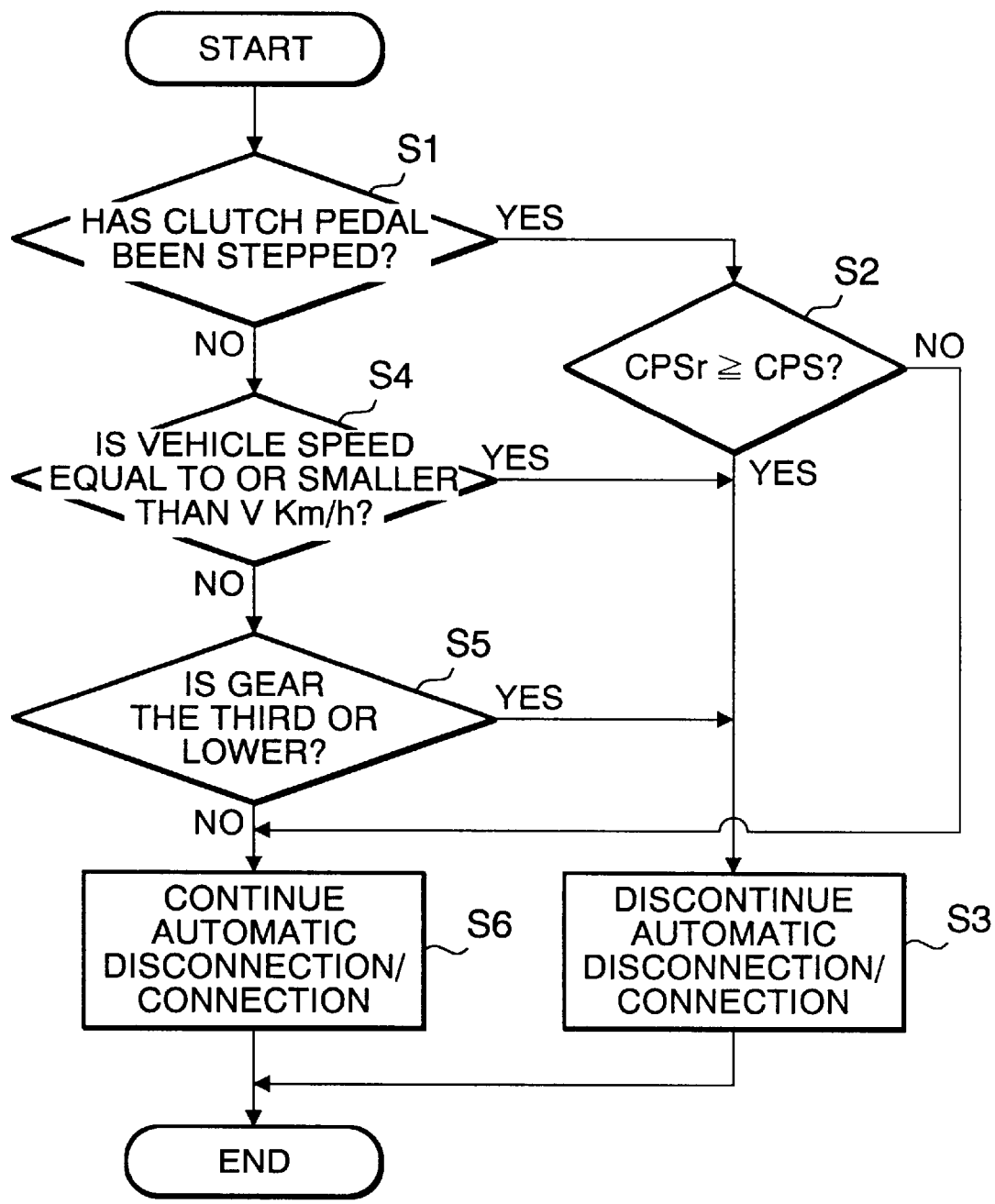
FIG. 7 is a control flow showing how transition from automatic operation to manual operation is controlled by a control unit.

As shown in FIG. 7, in the transmission control, whether the clutch pedal 9 has been stepped or not is at first determined according to the output signals from the clutch pedal switch 87 at step S1. When it is determined that the stepping has been done because of "ON" state of the clutch pedal switch 87(YES), whether or not the degree of the stepping(stroke) of the clutch pedal 9 exceeds the theoretical CPS value that corresponds to the actual clutch stroke CS is determined from the table of FIG. 6 at step S2.

More specifically, the Clutch Pedal Stroke CPS value that corresponds to the actual Clutch Stroke CS value is at first calculated according to the aforementioned table. The calculated CPS value is then compared with the actual Clutch Pedal Stroke CPSr value. When the CPSr(the actual CPS value) is determined to be equal to or larger than the calculated CPS value, that is, when the degree of the stroke of the clutch pedal 9 is determined to correspond to the actual degree(position) of Clutch Stroke or have enough impact to thrust the clutch 8 to more disconnected state, the automatic operation of the clutch 8 is discontinued at step S3. Then all the switch valves 78, 79, 81 are controllably made "OFF" state. In short, the clutch 8 is switched to the manual operation only when a stroke of the clutch pedal 9 corresponds to the actual or more disconnecting Clutch Stroke.

If it is determined that the clutch pedal 9 has not been stepped at step S1(NO), whether or not the speed of the vehicle is equal to or smaller than the threshold value V is determined at step S4. When the vehicle speed is equal to or smaller than the threshold value V(YES), the automatic operation is discontinued at step S3. When the vehicle speed is larger than the value V(NO), whether the gear is the third or lower is determined at step S5. If the gear is the third or lower(YES), the automatic operation is discontinued at step S3. If the gear is the fourth or highier(NO), the automatic operation is continued at step S6.

As described above, in the arrangement of the present embodiment, the automatic operation is allowed to be switched to the manual operation only when the clutch pedal 9 is stepped to such a degree as corresponding to the actual Clutch Stroke state or thrusting the clutch 8 to more disconnected state. Thus, undesirable connection of the clutch 8 during the shift from the automatic operation to the manual operation can substantially be avoided. For example, when the clutch 8 is sufficiently disconnected and the clutch pedal 9 is stepped in such a degree as slightly over the switch actuation position p2, the shift to the manual operation is avoided and the occurrence of sudden approach of the clutch and resulting connection shock can be prevented. In addition, unintended rapid acceleration and engine stall, or unintended abrupt disconnection of the automatic operation due to the driver's careless stepping of the clutch pedal 9 can also be prevented.

The present invention is not limited to the above described embodiment but can be adapted to any other suitable embodiments. For example, the clutch pedal 9 may be replaced with a hand-operated clutch lever or the like. Further, the number of gears shown in the control flow may be changed as desired.

What is claimed is:

1. A clutch disconnection/connection device comprising:
   manual disconnection/connection means for manual disconnecting/connecting a clutch according to clutch pedal stroke;
   automatic disconnection/connection means for automatically disconnecting/connection the clutch according to a predetermined program regardless of clutch pedal stroke by controllably supplying air pressure to or discharging the air pressure from a clutch booster;
   a clutch pedal stroke sensor for detecting magnitude of clutch pedal stroke;
   a clutch stroke sensor for detecting magnitude of clutch stroke; and
   a controller for normally performing automatic clutch disconnection/connection operation and for switching over to manual clutch disconnection/connection operation from the automatic disconnection/connection operation when the clutch pedal is stepped during automatic disconnection/connection operation in such a degree that the clutch pedal stroke becomes equal to or exceeds the clutch stroke.

2. The clutch disconnection/connection device of claim 1, wherein the automatic disconnection/connection means includes: a first air pressure supply path for supplying air pressure to the clutch booster; and a plurality of electromagnetic switch valves provided in the first air pressure supply path for controllably supplying the air pressure to or discharging it from the clutch booster based on control signals from the controller.

3. The clutch disconnection/connection device of claim 2, wherein each electromagnetic switch valve discharges the air pressure at a different rate from one another.

4. The clutch disconnection/connection device of claim 1, wherein the manual disconnection/connection means includes: an air pressure supply path for supplying air pressure to the clutch booster; a hydraulically-operated valve provided in the air pressure supply path for controllably supplying the air pressure to or discharging it from the clutch booster based on signal hydraulic pressure from a master cylinder that is associatedly driven by the operation of a clutch pedal; and a hydraulic pressure passage that links the master cylinder with the hydraulically-operated valve, the volume of the hydraulic pressure passage being changed in accordance with operation of the clutch booster.

5. The clutch disconnection/connection device of claim 4, wherein the master cylinder can be operated by either the clutch pedal or air pressure, and the air pressure is supplied or discharged during the automatic disconnection/connection operation of the clutch.

6. The clutch disconnection/connection device of claim 4, wherein the master cylinder has two serially arranged pistons, and both of the two pistons are driven by the clutch pedal during the manual disconnection/connection of the clutch while only one piston is driven by air pressure that is supplied to/discharged from between the two pistons during the automatic disconnection/connection of the clutch.

7. The clutch disconnection/connection device of claim 5, wherein the master cylinder has two serially arranged pistons, and both of the two pistons are driven by the clutch pedal during the manual disconnection/connection of the clutch while only one piston is driven by air pressure that is supplied to/discharged from between the two pistons during the automatic disconnection/connection of the clutch.

8. The clutch disconnection/connection device of claim 1, wherein the automatic disconnection/connection means includes: a first air pressure supply path for supplying air pressure to the clutch booster; and a plurality of electromagnetic switch valves provided in the first air pressure supply path for controllably supplying the air pressure to or discharging it from the clutch booster based on control signals from the controller; and wherein the manual disconnection/connection means includes: a second air pressure supply path for supplying air pressure to the clutch booster; a hydraulically-operated valve provided in the second air pressure supply path for controllably supplying the air pressure to or discharging it from the clutch booster based on signal hydraulic pressure from a master cylinder that is associatedly driven by the operation of a clutch pedal; and a hydraulic pressure passage that links the master cylinder with the hydraulically-operated valve, the volume of the hydraulic pressure passage being changed in accordance with operation of the clutch booster.

9. The clutch disconnection/connection device of claim 8, wherein the master cylinder can be operated by either the clutch pedal or air pressure, and the air pressure is supplied or discharged during the automatic disconnection/connection operation of the clutch.

10. The clutch disconnection/connection device of claim 8, wherein the master cylinder has two serially arranged pistons, and both of the two pistons are driven by the clutch pedal during the manual disconnection/connection of the clutch while only one piston is driven by air pressure that is supplied to/discharged from between the two pistons during the automatic disconnection/connection of the clutch.

11. The clutch disconnection/connection device of claim 9, wherein the master cylinder has two serially arranged pistons, and both of the two pistons are driven by the clutch pedal during the manual disconnection/connection of the clutch while only one piston is driven by air pressure that is supplied to/discharged from between the two pistons during the automatic disconnection/connection of the clutch.

* * * * *